Feb. 1, 1966 F. A. SIEMONSEN 3,232,260
END FORMER AND FLANGER
Filed March 1, 1962 8 Sheets-Sheet 1
STEP NO. 1
ALUMINUM DISC FED INTO IMPACT EXTRUDER
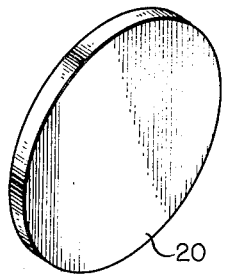
STEP NO. 2
TRIMMER REMOVES EXCESS METAL FROM FORMED CAN
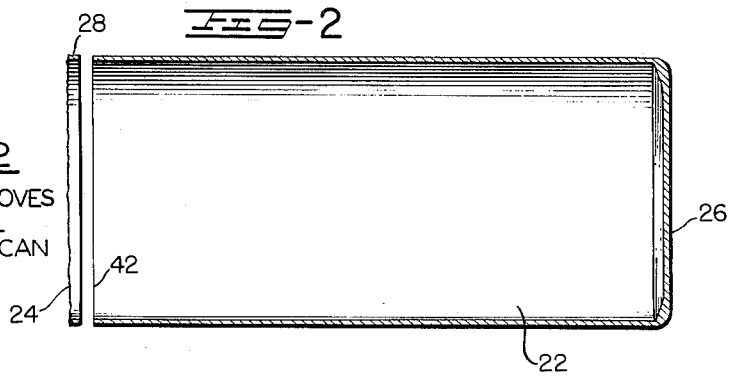
STEP NO. 3
BASE FORMED AND TOP FLANGED
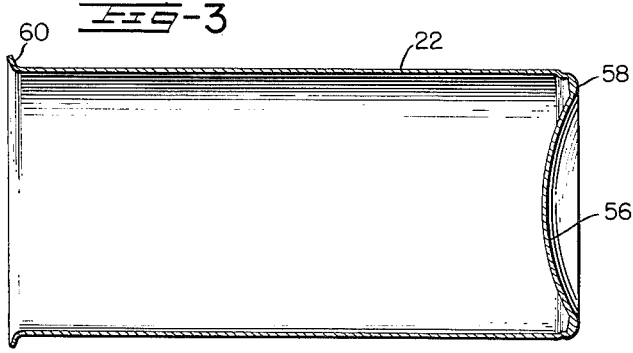
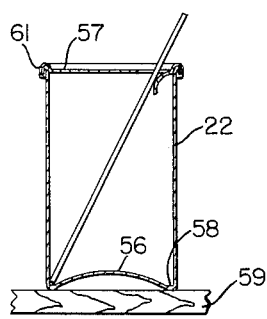
INVENTOR
FREDERIK A. SIEMONSEN
BY Glenn, Palmer & Matthews
ATTORNEYS Feb. 1, 1966    F. A. SIEMONSEN    3,232,260
END FORMER AND FLANGER
Filed March 1, 1962    8 Sheets-Sheet 2
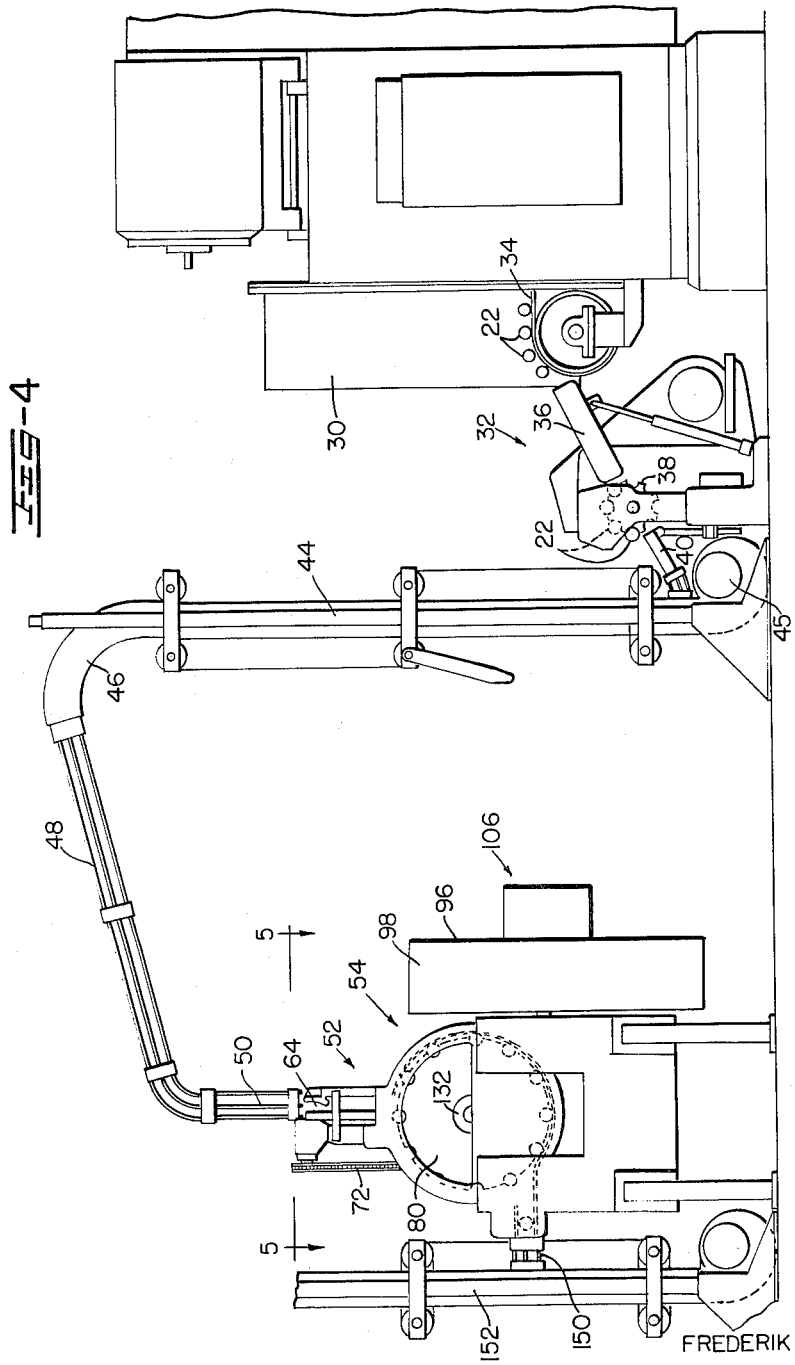
INVENTOR
FREDERIK A. SIEMONSEN
BY *Glenn, Palmer & Matthews*
ATTORNEYS

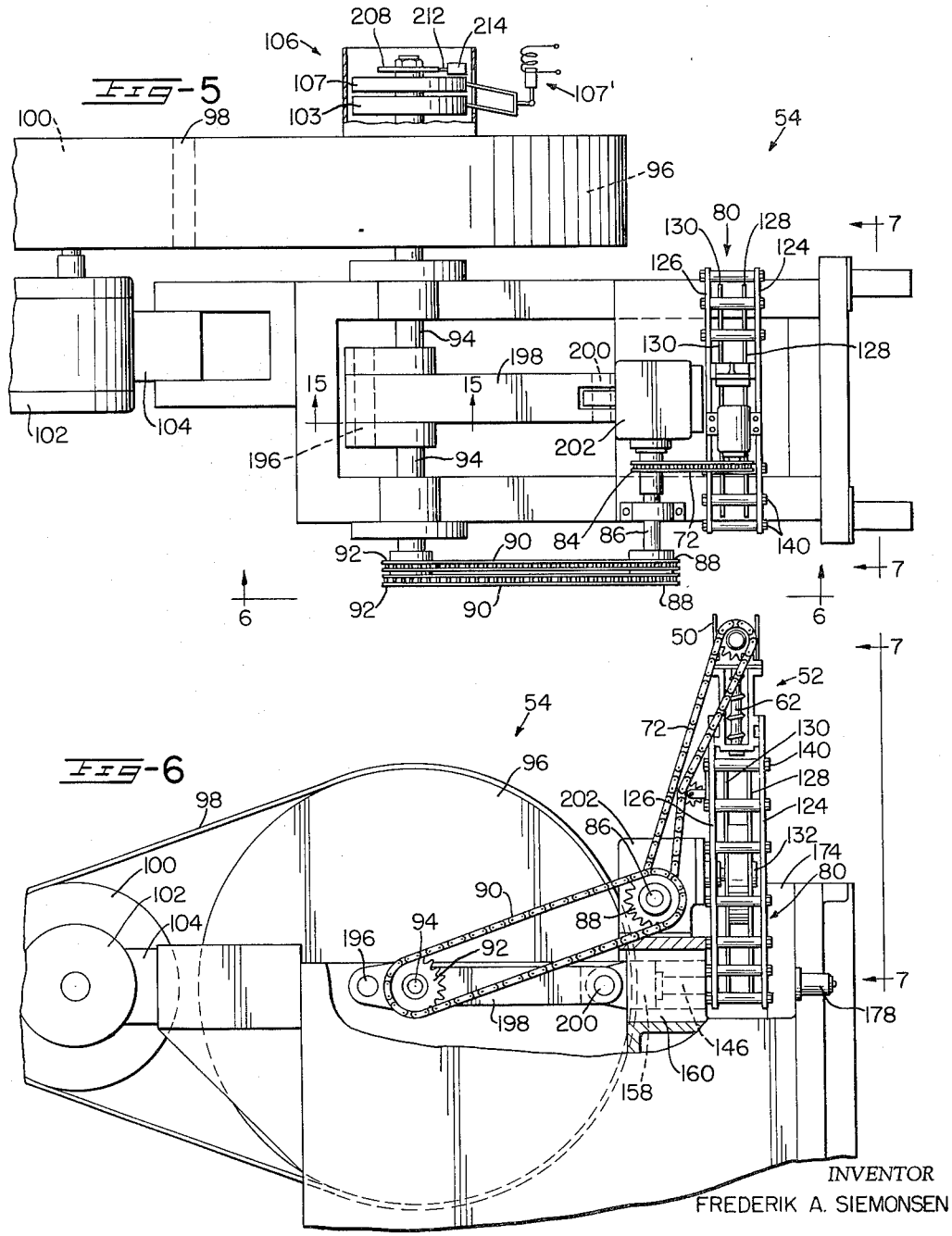

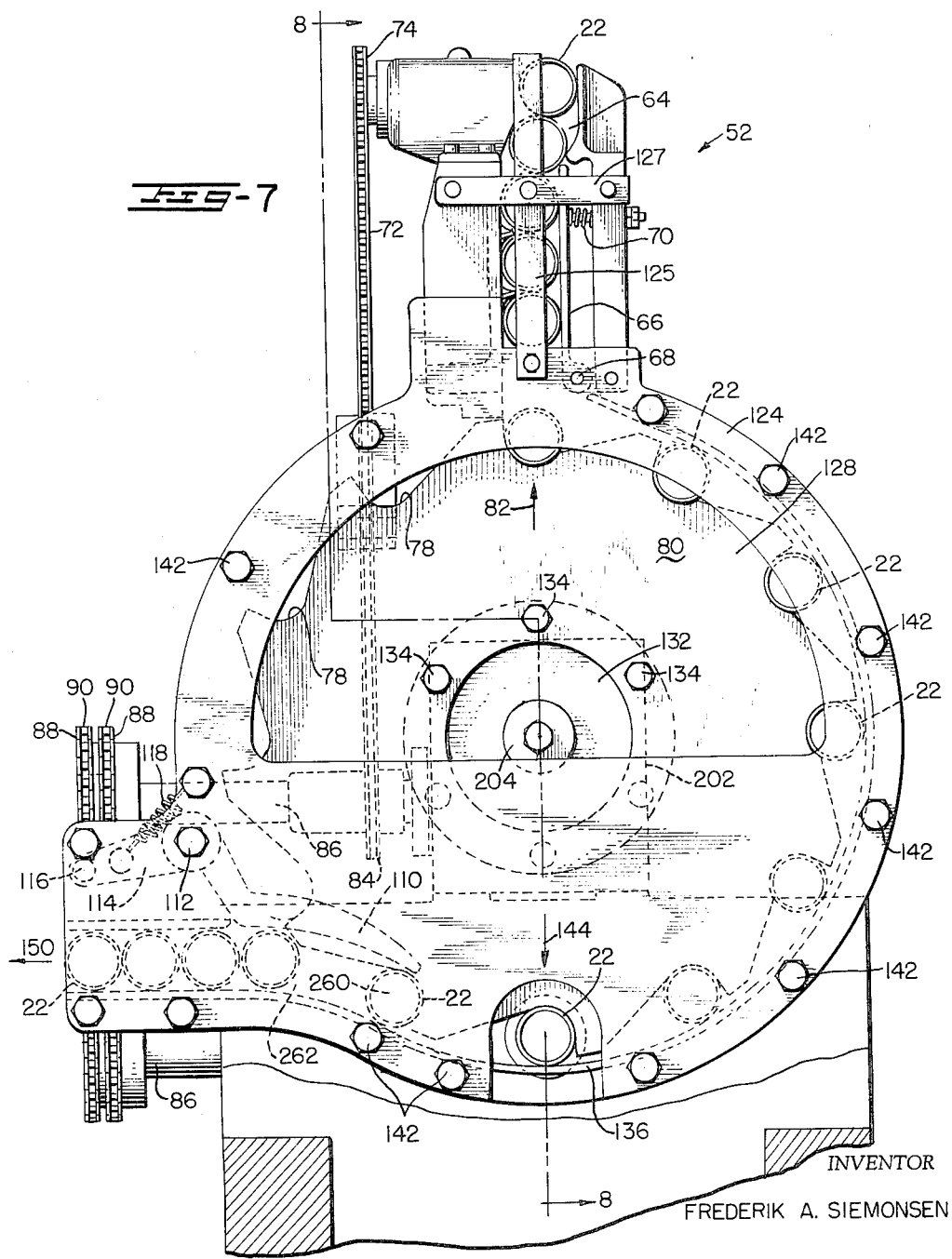

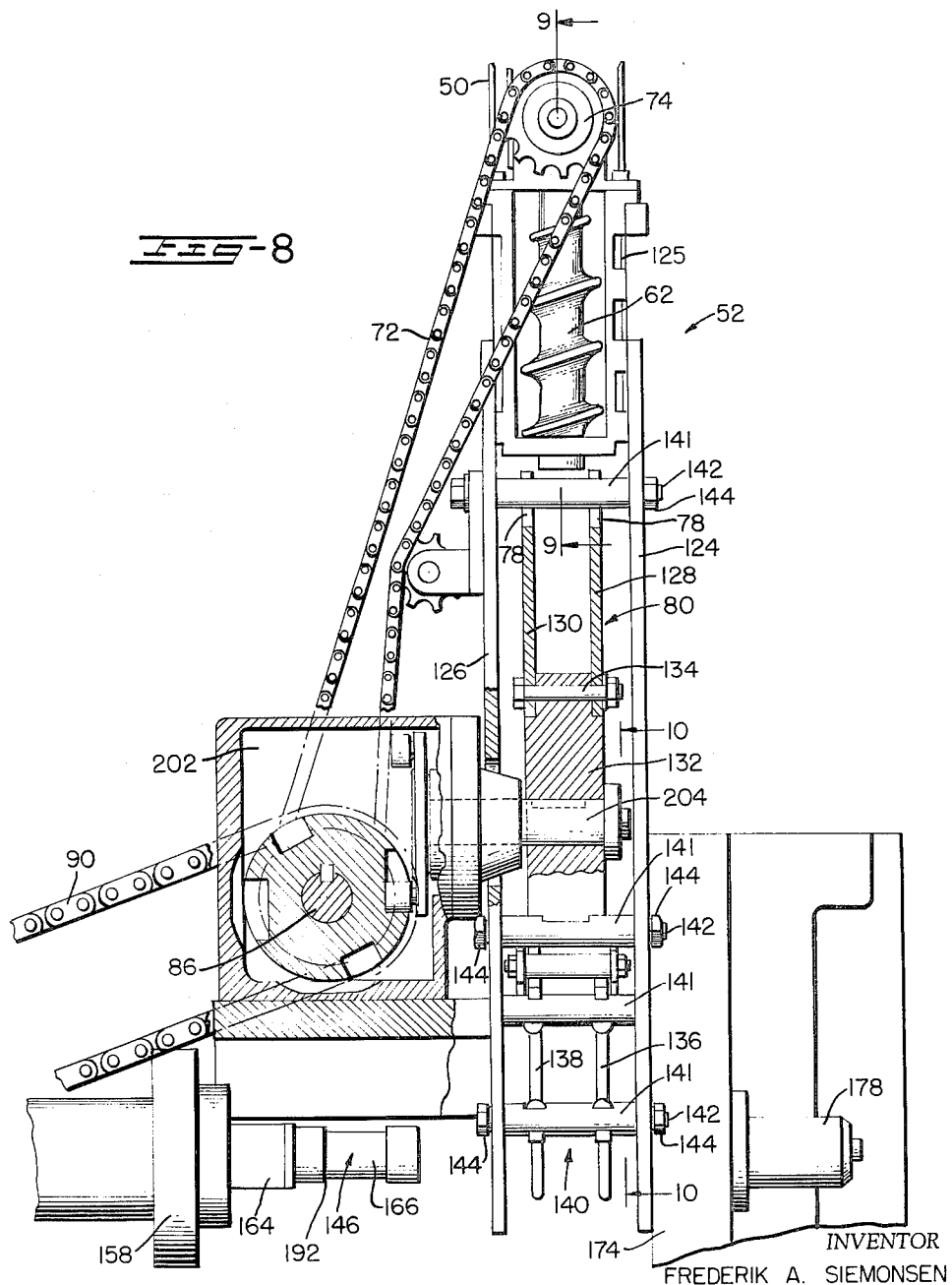

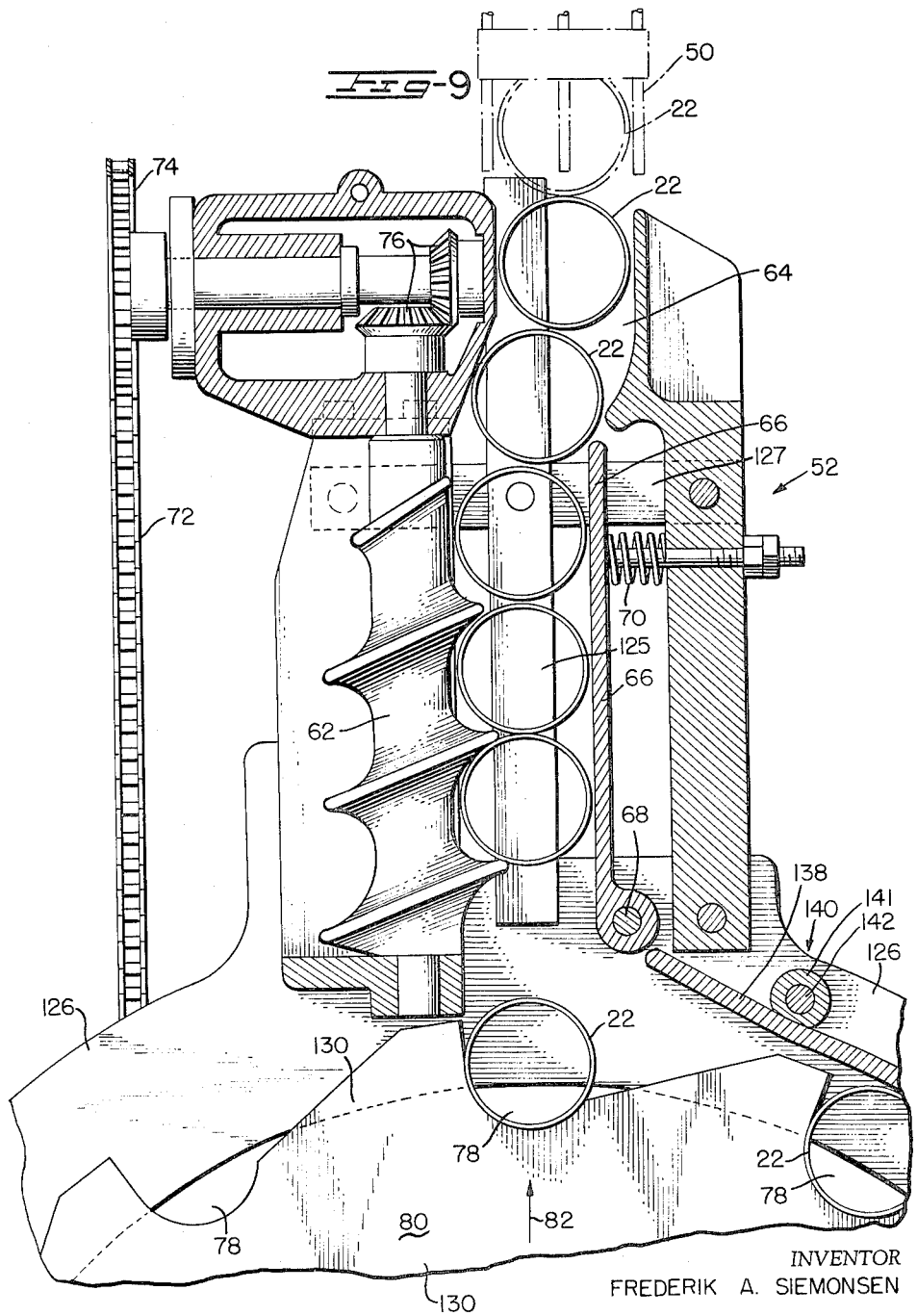

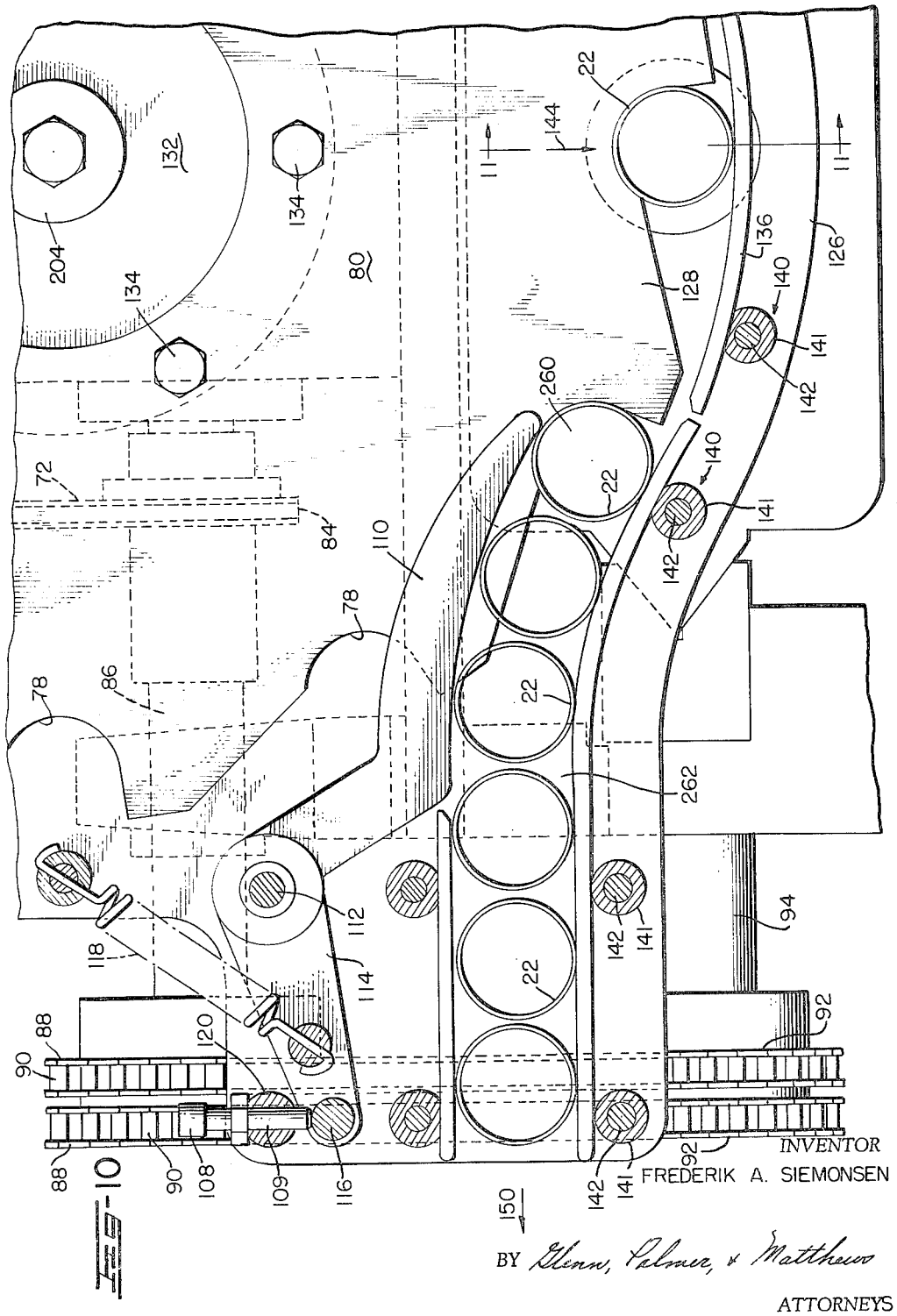

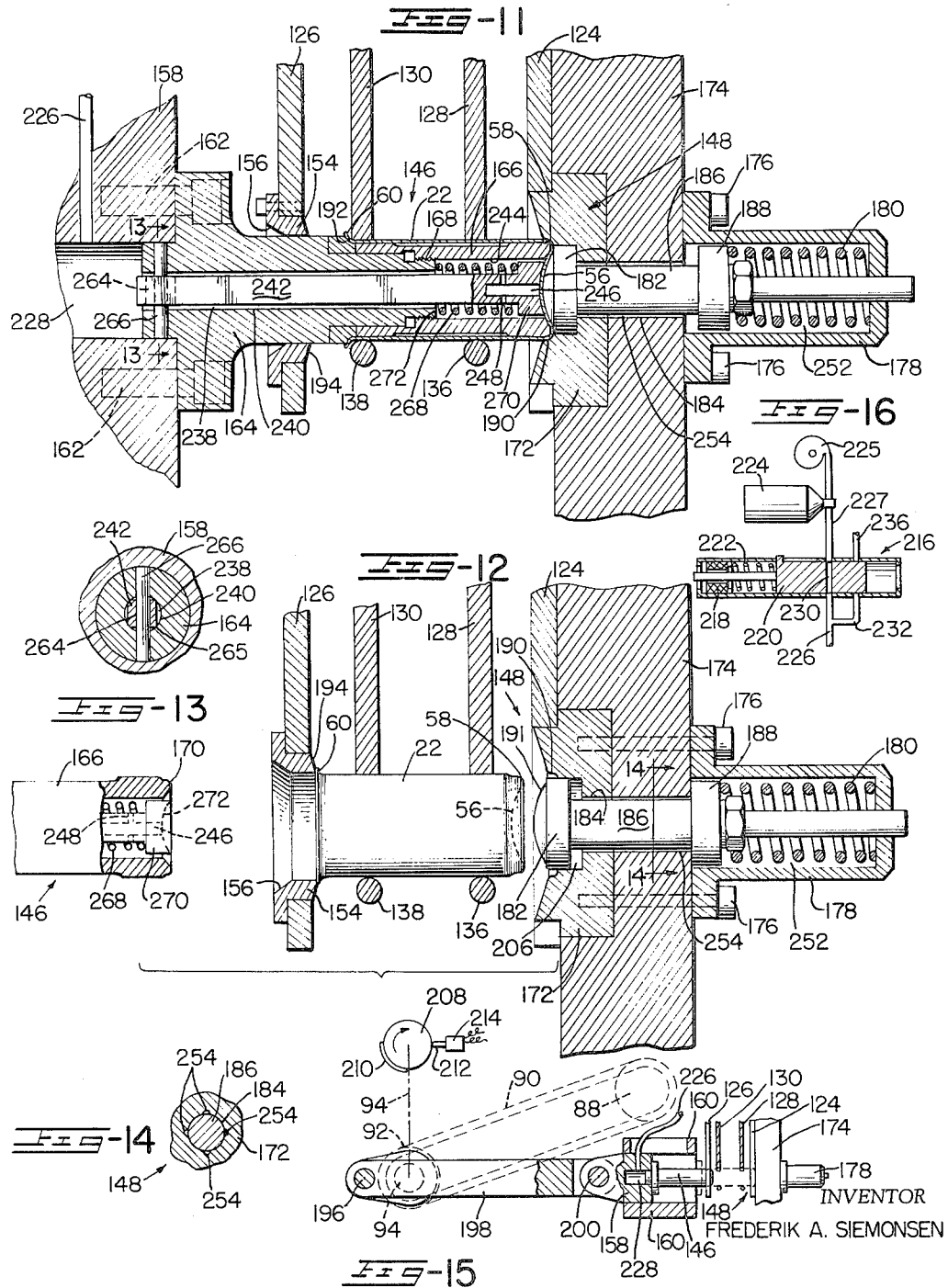

United States Patent Office 3,232,260
Patented Feb. 1, 1966

3,232,260
END FORMER AND FLANGER
Frederik A. Siemonsen, Bon Air, Va., assignor to Reynolds Metals Company, Richmond, Va., a corporation of Delaware
Filed Mar. 1, 1962, Ser. No. 176,749
24 Claims. (Cl. 113—120)

This invention relates to a new and improved container, and apparatus and method of forming the same.

The container of this invention may be a metal cylindrical container with an inwardly bowed or concaved bottom and with an outwardly flared or flanged open end to receive the material or fluid to be sealed in the container. The container then may be covered with a suitable metallic cover which may be secured, sealed or seamed to the flared or flanged open end.

The inwardly bowed or concaved bottom may be provided with a relatively narrow rim which lies in a substantially true plane perpendicular to the axis of the container, so the container may be placed on a table, tray, or the like, without likelihood of upsetting the container. The inwardly bowed bottom also has increased strength to resist outward pressure from fluid contents under pressure such as beer, or the like.

The cylindrical container may be made from a metal slug or disc by an impact extrusion press. Alternatively, the cylindrical container may initially be a drawn container, a drawn and re-drawn container, a drawn and ironed container, a re-drawn and ironed container or an impact extruded and ironed container. The rough edge of such container may be smoothly trimmed in a suitable trimmer. The trimmed container may then have its bottom inwardly bowed or concaved, and its open end outwardly flared in a suitable press means to receive the cover to be seamed thereon.

The press for inwardly bowing or concaving the bottom and for outwardly flaring or flanging the open end of the container and the method involved in its operation have novel and inventive features.

Accordingly, it is an object of this invention to provide a container having one or more of the features herein disclosed.

Another object of this invention is to provide apparatus having one or more of the features herein disclosed for forming a container.

Another object of this invention is to provide a method having one or more of the features herein disclosed for forming a container.

Other objects are apparent from this description and/or the accompanying drawings in which:

FIGURE 1 shows a blank in perspective from which the container may be made.

FIGURE 2 shows a cross section of an initial form of the container made from the blank of FIGURE 1, and with the raw end trimmed off.

FIGURE 3 shows in cross section a container ready to receive the contents and to have a cover applied thereto.

FIGURE 3A is a diagrammatic cross section of a container which has been filled, covered, and later opened for dispensing, as with a straw or the like.

FIGURE 4 is a diagrammatic view of the impact extrusion press, trimmer, and bottom and flare forming press assembled together.

FIGURE 5 is a top view, on an enlarged scale, taken along the line 5—5 of FIGURE 4.

FIGURE 6 is a side view of a portion of the apparatus shown in FIGURE 5, taken along the line 6—6 of FIGURE 5.

FIGURE 7 is an enlarged vertical view of a part of the bottom and flare forming press and taken from the lines 7—7 of FIGURES 5 and 6.

FIGURE 8 is a view partly in elevation and partly in section taken substantially along the line 8—8 of FIGURE 7.

FIGURE 9 is an enlarged cross section of a portion of FIGURE 8 taken substantially along the line 9—9 of FIGURE 8.

FIGURE 10 is an enlarged cross section of a portion of FIGURE 8 taken substantially along the line 10—10 of FIGURE 8.

FIGURE 11 is a vertical cross section on a slightly reduced scale taken along the line 11—11 of FIGURE 10 with the punch at the end of its stroke.

FIGURE 12 is a view similar to FIGURE 11 showing the punch retracted.

FIGURE 13 is a cross section along line 13—13 of FIGURE 11.

FIGURE 14 is a cross section taken along the line 14—14 of FIGURE 12.

FIGURE 15 is a diagrammatic side view, generally along line 15—15 of FIGURE 5, of the crankshaft and its reciprocation of the punch construction and its rotation of a cam to produce proper air pressures in the punch construction, die construction and/or the container which is being acted upon by the punch and die.

FIGURE 16 is a diagrammatic representation of an air system, including a control valve for producing the proper air pressures in connection with FIGURE 15.

Referring first to FIGURES 1–4, a metal slug or disc 20, which may be an aluminous metal disc, may be impact extruded into the shape of a container 22 with a raw edge 24. The container 22 may be cylindrical and may have a somewhat flat bottom 26.

Certain words indicating direction or relative position, such as "upper," "lower," "vertical," "bottom," "top," etc., are used herein for the sake of brevity and ease of description. However, it is to be understood that such description applies only to the drawings and that the members so described may actually have different directions or relative positions, in actual use, as is obvious.

The container 22, as shown in FIGURE 2, originally had integrally therewith an end portion 28 with the raw edge 24 when the slug 20 was extruded in an impact extrusion press 30, such as indicated in FIGURE 4.

The container 22 may have the end portion 28 trimmed off in a trimmer 32, FIGURE 4. The containers 22 are discharged on the belt 34 from the press 30 onto a chute 36 which feeds the containers 22 on to a container carrying wheel construction 38 which carries the containers past the trimmer members, not shown, so the trimmed containers 22, without the trimmed end portions 28, are discharged on to the chute or conveyor feeder 40.

The chute 40 feeds the trimmed containers 22, with relatively smooth edges 42, into a pneumatic conveyor 44 which is supplied with air under pressure by blower 45 and which carries the containers 22 upwardly through the encased conveyor 44 then around the encased conveyor bend 46 from which they are discharged in to the slanting gravity open cage conveyor part 48 and the vertical open cage, gravity conveyor part 50.

The open cage conveyor part 50 discharges the containers 22 relatively gently and without any substantial pneumatic force into the feeder 52 of the press means 54 which inwardly bows or concaves the bottoms and outwardly flares the ends of the containers.

The press means 54 receives the trimmed containers 22 of FIGURE 2, without the trimmed end portions 28, and inwardly bows or concave the previously somewhat flat bottoms 26 of FIGURE 2 into the inwardly bowed or concaved bottoms 56 of FIGURE 3. These bottoms 56 have relatively narrow rims 58 which lie in a substantially true plane perpendicular to the axis of the container, so the container 22 of FIGURE 3 may be placed on a table, tray, or the like 59, without great danger of upsetting, as indicated in FIGURE 3A. The inwardly bowed bottoms 56 also have increased strength to resist outward pressure from fluid contents under pressure, such as beer or the like.

The press means 54 also outwardly flanges, or flares the open end portion 60, later to receive a cover 57, FIGURE 3A, which may be seamed thereto at 61 after the container 22 of FIGURE 3 has received the material to be sealed therein. For example, beer or other fluids under pressure may be placed in the containers 22, after which suitable covers 57 are placed over the flared end portion 60 and are tightly seamed thereto by any suitable well known cover seaming apparatus or method.

The containers 22 and the cover 57 may be made of aluminous metallic material, such as commercially pure aluminum or an aluminum alloy of suitable strength and temper for the particular article to be produced.

The press means 54 which receives the trimmed containers 22 of FIGURE 2 from the gravity conveyor 48, 50 is more fully disclosed in FIGURES 5 through 16.

The containers are discharged gently from the vertical conveyor 50 into feed means 52 which is more fully shown in FIGURES 5–9.

The feed means 52 may include a vertical screw member 62, FIGURES 8 and 9, which is adapted to receive containers 22 as they fall from the vertical conveyor 50, as indicated in FIGURES 4 and 9. The containers 22 fall into the funnel-like construction 64 which guides the containers 22 into the space between screw 62 and the resiliently urged hinged wall 66, which is fulcrumed at 68 and is leftwardly urged, in FIGURE 7 by the compression spring 70. The screw 62 is driven at the correct speed by means of the chain 72, sprocket wheel 74, and the bevel gears 76.

The speed of rotation of the screw 62 is correctly timed by its drive mechanism, so that one container 22 is fed at the correct time into each of the notches 78, FIGURES 7–9, of the container carrying wheel construction 80 which is intermittently rotated one step at a time. Each step of rotation of wheel construction 80 produces an arc of rotation equal to the angular distance between adjacent notches 78. The container wheel construction 80 is so rotated that each notch 78 stops or dwells directly above the arrow 82 in FIGURES 7 and 9, where each notch 78 is ready to receive a container 22 as it falls from the screw 62 at the proper time. The notches 78 with their corresponding containers 22 are also caused to stop or dwell in the position below the arrow 144 in FIGURES 7 and 10 where the containers 22 are acted upon by a punch and die construction elsewhere described.

The chain 72 is driven by a sprocket wheel 84, FIGURES 5, 6 and 7. The sprocket 84 is driven by a shaft 86, FIGURES 5, 6, 7 and 10, which in turn is driven by sprocket wheels 88. The sprocket wheels 88 are driven by chains 90 which are driven by the sprockets 92 which are mounted on crankshaft 94. The crankshaft 94 is driven by a heavy fly wheel 96, FIGURES 5 and 6. The fly wheel 96 is driven by a belt 98 which in turn is driven by a pulley 100 of the electric motor 102. If desired, the motor 102 may be hingedly supported at 104 to maintain the belt 98 in proper tension.

The fly wheel 96 may drive the crankshaft 94 through the medium of a combined electrically energized magnetic clutch and brake partly shown at 106, FIGURE 5.

This combined clutch and brake 106 may include an automatic clutch 103, an automatic brake 107 and a solenoid 107'. The clutch and brake 106 is well known per se, and hence is not further illustrated. When the solenoid 107' of the magnetic clutch and brake 106 is properly energized, the clutch mechanism 103, which may be within the fly wheel 96, drivingly engages the fly wheel 96 to the crankshaft 94. At the same time the automatic brake 107 for the crankshaft 94 is released. When the solenoid 107' of the magnetic clutch and brake 106 is properly de-energized, the clutch mechanism 103 is declutched and the brake 107 is simultaneously applied to the crankshaft 94 to stop rotation of the shaft 94 as quickly as possible while the heavy fly wheel continues to rotate. The magnetic clutch and brake 106 is controlled by a safety switch 108 and actuator 109, FIGURE 10, which properly controls the solenoid 107' of the magnetic clutch and brake 106, to stop rotation of the crankshaft 94, whenever the containers 22, in FIGURE 10, start to pile up in such a manner as to move the lever 110 upwardly about the fulcrum shaft 112, which in turn downwardly moves the lever 114, so that pin 116 is downwardly moved and allows the actuator 109 of the safety switch 108 to move downwardly to de-clutch and brake the crankshaft 94.

The lever 114 may be upwardly pulled by the tension spring 118 against the stop pin 120, and this maintains the lever 110 in the normal position as shown in FIGURE 10 to receive the containers 22 as they are delivered by the container carrying wheel 80.

A manual switch, not shown, may be provided in electrical series with the safety switch 108 so the crankshaft 94 may be manually stopped whenever desired and may be manually started also, provided the safety switch 108 is closed.

The clutch 100 and brake 100 are shown axially displaced from the fly wheel 96 in FIGURE 5 for convenience in illustration, but they may be nested together as desired in actual use.

The container carrying wheel construction 80 may be carried within the frame members 124 and 126, FIGURES 5, 6, 8, 11 and 12. The wheel construction 80 may include two discs 128 and 130 which are secured to the hub construction 132 by means of bolts 134, FIGURE 8. Each of the discs 128 and 130 have aligned container receiving notches 78. A plurality of container retaining arcuate stationary rods 136 and 138 are stationarily held adjacent the peripheries of the discs 128 and 130. These retaining rods 136 and 138 may be continuous rods, or they may be aligned rods, as shown in FIGURE 10. These rods 136 and 138 are carried by bolt-like constructions 140, which may include the outer sleeves 141 and the inner bolts 142. The bolts 142 are secured to the frame members 124 and 126 by means of the nuts 144. The rods 136 and 138 may be welded or otherwise secured to the sleeves 141. The rods 136 and 138 are properly spaced from the wheel discs 128 and 130, so that they maintain the containers 22 securely within the notches 78, as the containers travel downwardly from the position 82 to the position indicated by the arrow 144, FIGURES 7 and 10, at which position the containers 22 are serially subjected to a punch and die action, by the punch construction 146 and the die construction 148, FIGURE 11, inwardly to concave the bottoms 56 of the container 22, FIGURE 11, and outwardly to flange the open end 60.

The punch construction 146, and the die construction 148 operate on the particular container 22 which happens to be in the position 144 of FIGURES 7 and 10. The punch construction 146 enters through the guide member 154, FIGURES 11 and 12, which is flared at 156 to guide the punch construction 146 into the waiting container 22.

The punch construction 146 may include a reciprocating guide head 158 which slides in horizontal guides 160, FIGURE 15. The guide head 158 may have bolted thereto, by bolts 162, FIGURE 11, a punch carrier 164 to which the removable punch tool 166 may be threadedly attached at 168. The front end of tool 166 may be shaped at 170, FIGURE 12, to produce the narrow rim 58 at the bottom of the container 22.

The die construction 148 may include a guide tool 172, FIGURES 11, 12 and 14, which may be imbedded in the backing member 174 which may be suitably secured to the frame member 124 by means of bolts 176 which also hold the spring container cup 178, and which contains the compression spring 180.

A counter die member 182 is reciprocable within the opening 184 with its shaft 186 passing through the opening 184 and having a head 188 which impinges against the backing member 174. The head 188 of counter die member 182 is leftwardly urged by spring 180, which is retained in container cup 178.

As the punch tool 166 is pushed rightward to the position shown in FIGURE 11, it enters the guide member 154 and the container 22 while the container 22 is still in the shape shown in FIGURE 2. At that time the counter die member 182 is in its most leftward position which is shown in FIGURE 12. The punch tool 166 drives the container 22 rightward against the counter die member 182. The combined action of the end 170, the die groove 190 and the dome-shaped head 191 of counter die member 182 causes the bottom of the container to be formed into the shape shown at 56 and 58 in FIGURES 3, 11 and 12. Simultaneously with the bowing of the bottom of the container, a tapered shoulder 192 in the punch member flanges the flared construction 60 at the open end of the container 22.

When the punch tool 166 is pulled out leftwardly from the position of FIGURE 11, the flared end 60 engages the flared side 194 of the guide member 154 and the container 22 is stripped from the punch member 146 as shown in FIGURE 12.

The punch member 146 and its sliding guide head 158 are reciprocated by the crank 196, FIGURES 5, 6 and 15. The crank 196 moves the crank rod 198 switch is pivotally secured at 200 to the sliding guide head 158. The punch 146 reciprocates from the time it enters the guide member 154 rightward until it leaves the guide member 154 leftward during a fraction of a complete revolution of the crank 196. The container carrying wheel construction 80 is rotated to move the next container 22 and its carrying notch 78 into the position 144 of FIGURES 7 and 10, while the punch member 146 is reciprocating on the left side of guide member 154 and while it is not engaged with any container 22.

The container carrying wheel construction 80 is intermittently rotated to move the next notch 78 and container 22 by means of an index drive construction 202, FIGURE 8, which may be of any well known type which rotates the wheel shaft 204 for the required angle during a fraction of a complete revolution of shaft 86 and of the equally rotating crank shaft 94. The fraction of revolution of shafts 86 and 94 during which the wheel shaft 204 is partially rotated does not include any of the fraction of revolution of shafts 86 and 94 during which the punch 146 enters and leaves the guide member 154. Hence the containers 22 and their carrying notches 78 are moved from one position to the next position only during the time that the punch member 146 is withdrawn from the guide member 154, and vice versa.

Compressed air may be introduced into the container 22 from a time when the punch 146 starts to recede leftward from the position shown in FIGURE 11. Also, if desired, the air pressure in this space may be relieved during the reverse movement of the punch member 146.

To this end a cam disc 208, FIGURE 15, or the like, with a cam 210 may be carried at any suitable place on the crankshaft 94 which engages an actuating pin or member 212 on a switch 214. The switch 214 may alter or close a circuit at the time that the punch member 146 starts to recede leftwardly from the position of FIGURE 11. This circuit may energize one or two solenoid valves 216, FIGURE 16, which cause the solenoid 218 to pull the valve plunger 220 leftward against the compression spring 222 to connect the compressed air accumulator 224, air compressor 225 and compressed air line 227 with a flexible air line 226, FIGURE 15, which is connected with the interior cavity 228 of the sliding head 158, FIGURE 11. When the solenoid 218 is de-energized, at the time when the punch 146 is withdrawn from the guide member 154, for example, the plunger 220, FIGURE 16, is pushed rightward by spring 222 when the solenoid 218 is de-energized, so the plunger passageway 230 is moved into alignment with passageways 232 and 236 to connect the cavity 228, FIGURE 11 with the atmosphere at the outlet end of passageway 236, FIGURE 16. The cavity 228 of guide head 158 is connected with the interior of container 22 by passageways 238, FIGURES 11 and 13, between the cylindrical bore 240 and the rectangular rod 242. The passageways 238 connect with the cavity 244 which connects by passageways 246 and 248 with the bottom 56 of the container 22. This causes compressed air to be introduced into the container 22 while the punch 146 is being rapidly withdrawn and thus prevents possible inward collapse of the container. Also, the compressed air aids in blowing the containers 22 off the punch on the withdrawal stroke of the punch. On the inward reverse stroke of the punch the cavity 228 and the interior of the container 22 may be connected to the atmosphere, if desired, through the discharge passageway 236 when the switch 214 is de-energized, and the plunger 220, FIGURE 16, is moved rightward to connect pipes 226 and 236.

The die cavity 206, FIGURE 12, may be connected by grooves 254 with the interior cavity 252 of spring container 178. When the counter punch 182 is being moved rightwardly from the position of FIGURE 12 to the position of FIGURE 11, the air in the cavity 206 is allowed to pass rightwardly through the grooves 254 into the interior cavity 252 of the spring container 178. This allows the counter punch to move completely to the rightward position of FIGURE 11, while compressing the spring 180.

When the counter punch 182 moves leftwardly from the position of FIGURE 11 to the position of FIGURE 12, air may pass through the grooves 254 from the cavity 252 into the cavity 206 while the spring 180 is pushing the counter punch 182 to the leftward position of FIGURE 12.

In this manner undue compression pressures and undue vacuums may be prevented during the operation of the punch and die members 146 and 148, and the containers 22 are more easily removed from the punch member.

After the punch member 146 is withdrawn from the container 22, the wheel construction 80 is moved another rotational step and the completed container is moved leftward, in FIGURE 10 to the position 260, FIGURE 10. Thus a series of containers 22 are produced in the discharge passage 262. Containers 22 are discharged at 150, FIGURES 4 and 10, into the conveyor 152 by which they may be introduced into a degreasing tank or apparatus to cleanse the containers so they may be filled with the contents to be sealed therein, such as beer or the like.

The rectangular rod 242, with rounded corners 265 has a slot 264 through which the cross pin 266 passes. The cross pin 266 is held stationary in punch carrier 164 and allows the rod 242 to reciprocate in carrier 164 for the distance of the slot 264. The rod 242 slides in the cylindrical bore 240. It is rightwardly pushed, FIGURE 11, by compression spring 268 which engages the head 270 at one end and the edge 272 of punch carrier 164 at the other end of spring 268. The pin 266 and slot 264 permit reciprocation of rod 242 and head 270 but prevent the rod and head from flying out rightwardly on the leftward withdrawing stroke of the punch.

The head 270 is concaved at 272 to cooperate with the convexed counter punch 182 to form the inward bow 56 in the bottoms of the containers 22 during the rightward inward stroke of the punch.

The container, as shown in FIGURE 3, may be approximately 2.06 inches internal diameter and 4⅜ inches in length.

In operation, slugs 20, FIGURE 1, are fed to impact extrusion press 30, FIGURE 4, where the slugs 20 are impact extruded into containers 22, FIGURE 2, with the end portions 28 integrally attached thereto to form ragged edges 24 for the containers.

The containers 22 with end portions 28 integrally attached thereto are discharged by conveyor 34 into chute 36 and onto star wheel 38 which carries the containers 22 past the trimmer members of trimmer 32, FIGURE 4. The containers have end pieces 28 trimmed off in trimmer 32 which then discharges the trimmed containers 22 of FIGURE 2 into pneumatic conveyor intake 40 which then transports the containers to the inlet member 52 of the press means 54.

In press means 54 the containers are fed by screw 62 downwardly into the notches 78 at the position indicated by arrow 82, FIGURES 7 and 9. The wheel construction 80 advances the notches and respective containers 22 clockwise in step by step fractional rotation movements equal to the angular distance between adjacent notches 78. Eventually the containers reach the position indicated by the arrow 144, FIGURES 7 and 10, where the containers pause long enough to be subjected to a punch and die action produced by punch construction 146 and die construction 148, FIGURE 11.

The punch and die action at FIGURE 11 forms the inward bow 56, FIGURE 3, at the bottom of the container and the outward flare 60 at the open end of the container.

After this punch and die action, the containers 22 are advanced leftwardly step by step to the position 260, FIGURE 10. Thereafter the containers 22 are pushed, side by side, through channel 262 to outlet 150. Here they are discharged into pneumatic conveyor 152, FIGURE 4, to be conveyed where desired, such as into a degreasing and cleaning apparatus, not shown. The containers may then be filled with any desired commodity, such as beer or the like, and the covers 57 may then be sealed or seamed with the flared open end 60 by suitable apparatus, not shown, to produce the container shown in FIGURE 3A. This container may be opened by any well known can opener and may be placed on a table or the like 59 with the rim 58 resting on such table or the like. The contents may be poured from the containers through a cut opening, or may be dispensed by the use of a "straw," as illustrated.

The punch and die action is produced by the connecting rod 198 actuated by the crank 196, as illustrated in FIGURES 5 and 6.

Suitable air pressures are maintained in the punch and die members and in the containers to prevent unduly high air pressures or unduly low vacuums therein.

The containers 22 are prevented from moving longitudinally unduly while passing through the feed means 52 by the bars 125 which may be placed on both sides of the feeds means 52. The bars 125 are braced by cross bars 127, which are bolted to the frame members of the feed means 52.

The containers 22 are also prevented from moving longitudinally unduly by the frame members 124 and 126 which are on both sides of the wheel construction 80.

Multiple tooling stations may be provided for the star wheel 80 so a plurality of containers 22 may be fed substantially simultaneously to a plurality of notches 78 near the top of star wheel 80. These containers may all be fed while the star wheel 80 is in stopped condition.

At the same time a similar plurality of pairs of punches 146 and dies 182 may be provided near the bottom of the star wheel 80 to form the bottoms 56 and flanges 60 of the same plurality of containers 22 while the star wheel is in said stopped position.

In this manner more than one container may be fed at each station stop of the star wheel and the output may be correspondingly increased.

For example, a plurality, such as three worm feeds 62, may be provided at the top of star wheel 80 instead of the single worm feed 62 shown in FIGURES 7 and 9. These three worm feeds 62, not shown, may simultaneously feed three containers 22 near the top of star wheel 80 during a single station stop.

Simultaneously, during said station stop, three containers may have bottoms 56 and flanges 60 formed at the bottom of star wheel 80. For this purpose three pairs of punches 146 and dies 182 (of the character shown in FIGURES 11 and 12) may be provided at the bottom of the star wheel 80 instead of the single pair previously described to be present in FIGURES 5–8 and 10. These three pairs of punches and dies may simultaneously form the said three bottoms 56 and flanges 60 of three containers 20 during said single station stop.

The indexing of star wheel 80 would be three times the distance than previously described and illustrated. That is, three notches 78 would be indexed at a time for each station stop.

The bottom and flange forming constructions herein disclosed may be used with drawn and ironed containers as well as with impact extruded containers which have been illustrated. Therefore, while the bottom and flanging apparatus has been illustrated in combination with an impact extruded container, any type of container may have its bottom formed and its upper wall flanged by this apparatus.

For example, the container can be one which is simply a drawn container, or a drawn and redrawn container, or a drawn and ironed container, or a drawn, redrawn and ironed container, or an impact extruded and ironed container and the like.

While the form of the invention now preferred has been disclosed as required by the statutes, other forms may be used, all coming within the scope of the claims which follow.

What is claimed is:

1. A process of inwardly bowing the bottoms of cylindraceous containers which have bottoms and trimmed open ends which comprises: alternately rotating and stopping a container carrying wheel construction having a periphery moving in parallel relationship to a substantially flat plane and with its axis of rotation substantially perpendicular to said flat plane and with a plurality of container carrying notches along said periphery; serially feeding said containers into said notches with their axes substantially perpendicular to said plane and while said notches are stopped at a fixed container feed position; and serially simultaneously inwardly bowing the bottoms and outwardly flaring said trimmed open ends of said containers by bowing means and flaring operated by a crankshaft while said wheel construction is serially stopped while respective ones of said containers are at a bowing position.

2. A process according to claim 1 in which a punch and die construction operated by said crankshaft is the bowing means and the flaring means.

3. A combination comprising: an alternately rotated and stopped container carrying wheel construction having a plurality of container carrying notches along its periphery; means serially to feed containers into said notches with the axes of said containers parallel to the axis of rotation of said container carrying wheel; and a punch and die construction with its axis parallel to the axis of rotation of said wheel construction and with said punch serially reciprocating into and out of containers in said notches when said wheel construction is stopped; and a flared stationary stripping member through which said punch reciprocates to strip said containers off said punch.

4. A combination according to claim 3 in which means are provided to supply compressed air to said punch construction when said punch is reciprocating out of said containers.

5. A combination according to claim 3 in which means are provided to relieve air pressures in said containers when said punch reciprocates into said containers.

6. A combination according to claim 3 in which said punch has a resiliently held concaved head within a hollow tool at said punch end and said die has a resiliently mounted dome shaped head cooperating with said concaved head inwardly to bow the bottoms of said containers.

7. A combination comprising: an alternately rotated and stopped container carrying wheel construction having a periphery moving in a substantially vertical plane, with its axis of rotation substantially horizontal and with a plurality of container carrying notches along said periphery; means serially to feed containers with integral bottom and trimmed open ends into said notches with their axes substantially horizontal and while said notches are stopped substantially at the top of said periphery; and means serially simultaneously inwardly to bow the bottoms and outwardly to flare the trimmed open ends of said containers while said wheel construction is serially stopped while respective ones of said containers are substantially at the bottom of said periphery.

8. A combination according to claim 7 in which a vertical screw conveyor is provided above said wheel to feed said containers to said wheel.

9. A combination according to claim 8 in which a resiliently urged wall is provided adjacent said screw.

10. A combination according to claim 7 in which means are provided to discharge said containers from said wheel construction after the bottoms of said containers have been bowed inwardly and the open ends of said containers have been flared outwardly.

11. A combination comprising: an alternately rotated and stopped container carrying wheel construction having a periphery moving in parallel relationship to a substantially flat plane and with its axis of rotation substantially perpendicular to said flat plane and with a plurality of container carrying notches along said periphery; means serially to feed containers with integral bottoms and trimmed open ends into said notches with their axes substantially perpendicular to said plane and while said notches are stopped at a fixed container feed position; and simultaneously bowing and flaring means operated by a crankshaft serially and simultaneously to bow the bottoms of said containers inwardly and outwardly to flare said trimmed open ends of said containers while said wheel construction is serially stopped while respective ones of said containers are at a bowing and flaring position.

12. A combination according to claim 11 in which a reciprocating punch and die construction operated by said crankshaft comprises the simultaneous bowing and flaring means.

13. A combination according to claim 12 in which said punch and die construction includes a punch with concaved head inwardly to bow the bottoms of the containers, and with a tapered circular shoulder spaced from said head outwardly to flare said trimmed open ends of said containers.

14. A combination according to claim 13 in which said reciprocating punch passes through a circular guide member with a flared side which engages the flared trimmed open ends of said containers and strips the containers from said punch.

15. A combination according to claim 13 in which said die includes a dome shaped head which cooperates with said concaved head of said punch to bow the bottoms of said containers.

16. A combination according to claim 11 in which said bowed and flared containers are discharged from said wheel construction into a discharge passage having a safety means to stop operation of said wheel whenever containers start to pile up in said discharge passage.

17. A combination according to claim 16 in which said safety means includes a lever responsive to the piling up of said containers in said passage.

18. In combination: a longitudinally reciprocal punch having a relatively rigid hollow cylindrical punch tool having a rigid annular leading edge at its forward end; a tapered circular shoulder rigidly held on said punch and spaced from said rigid annular leading edge; a concaved head resiliently mounted in said punch within said hollow cylindrical punch tool adjacent said annular leading edge; a die member having a dome shaped head resiliently mounted in said die member to be engaged by the end of said punch; and means to position a cylindrical container with an integral bottom and a trimmed open end to receive said punch in said open end, said annular leading edge, concaved head and dome shaped head inwardly bowing said integral bottom and said tapered circular shoulder outwardly flaring said trimmed open end.

19. A combination according to claim 18 in which a guide member is provided with a side wall to engage the container flared end, said guide member having an opening through which said circular shoulder passes outwardly to flare said open end.

20. A combination according to claim 18 in which said concaved head is resiliently biased forwardly by a compression spring and is limited in its forward movement by a slotted rod in said punch with an arresting pin in said slot, said concaved head and slotted rod being shaped to conduct air along said rod and concaved head into and from the interior of said container.

21. A combination according to claim 18 in which said die member has a stationary guide tool having an annular groove surrounding said resiliently mounted dome shaped head to cooperate with said annular leading edge of said punch tool to form a relatively narrow rim in the bottom of the container.

22. A combination according to claim 18 in which means are provided to withdraw air from said container along said punch as said punch is inserted into said container and to insert air into said container as said punch is withdrawn from said container.

23. In combination: a wheel construction having a plurality of intermittently rotatable discs having container receiving notches at their peripheries; two flat frame members respectively on each side of said discs and held spaced apart by bolt-like constructions surrounding said discs; and container retaining arcuate stationary rods stationarily held adjacent the peripheries of said discs by said bolt-like constructions; means to introduce closed bottom, open ended containers in said notches at one place in said wheel construction; and a reciprocal punch and die construction perpendicular to said discs at another place in said construction and effective to bow the closed bottoms of said containers.

24. A combination according to claim 23 in which said containers are introduced substantially at the top of said wheel construction and said punch and die construction is at the bottom of said wheel construction.

References Cited by the Examiner

UNITED STATES PATENTS

| 1,055,467 | 3/1913 | Johnson. | |
| 1,715,388 | 6/1929 | Reinhardt | 113—7 |
| 1,773,926 | 8/1930 | Michael. | |
| 2,298,366 | 10/1942 | Gladfelter et al. | 113—7 X |
| 2,686,551 | 8/1954 | Laxo | 153—2 |
| 2,968,090 | 1/1961 | Cohrs et al. | 29—240 |
| 3,029,507 | 4/1962 | Gaggini | 29—534 |
| 3,033,264 | 5/1962 | Henrickson | 153—2 |

WHITMORE A. WILTZ, *Primary Examiner.*